Nov. 11, 1952     E. A. ROCKWELL     2,617,259
MASTER CYLINDER POWER SYSTEM
Original Filed Jan. 4, 1940     3 Sheets-Sheet 1

Inventor
Edward A. Rockwell
By Arthur Wright
Attorney

Nov. 11, 1952      E. A. ROCKWELL      2,617,259
MASTER CYLINDER POWER SYSTEM
Original Filed Jan. 4, 1940      3 Sheets-Sheet 2
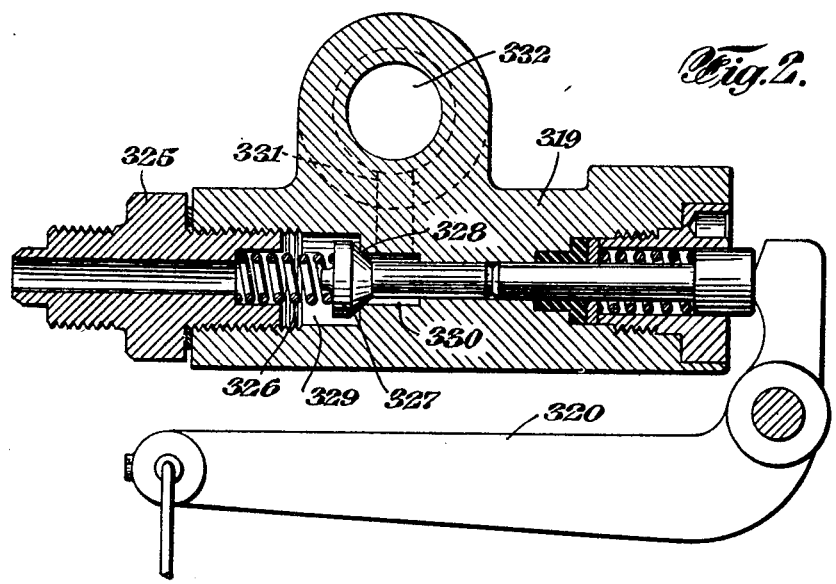
Inventor
Edward A. Rockwell
By Arthur Wright
Attorney

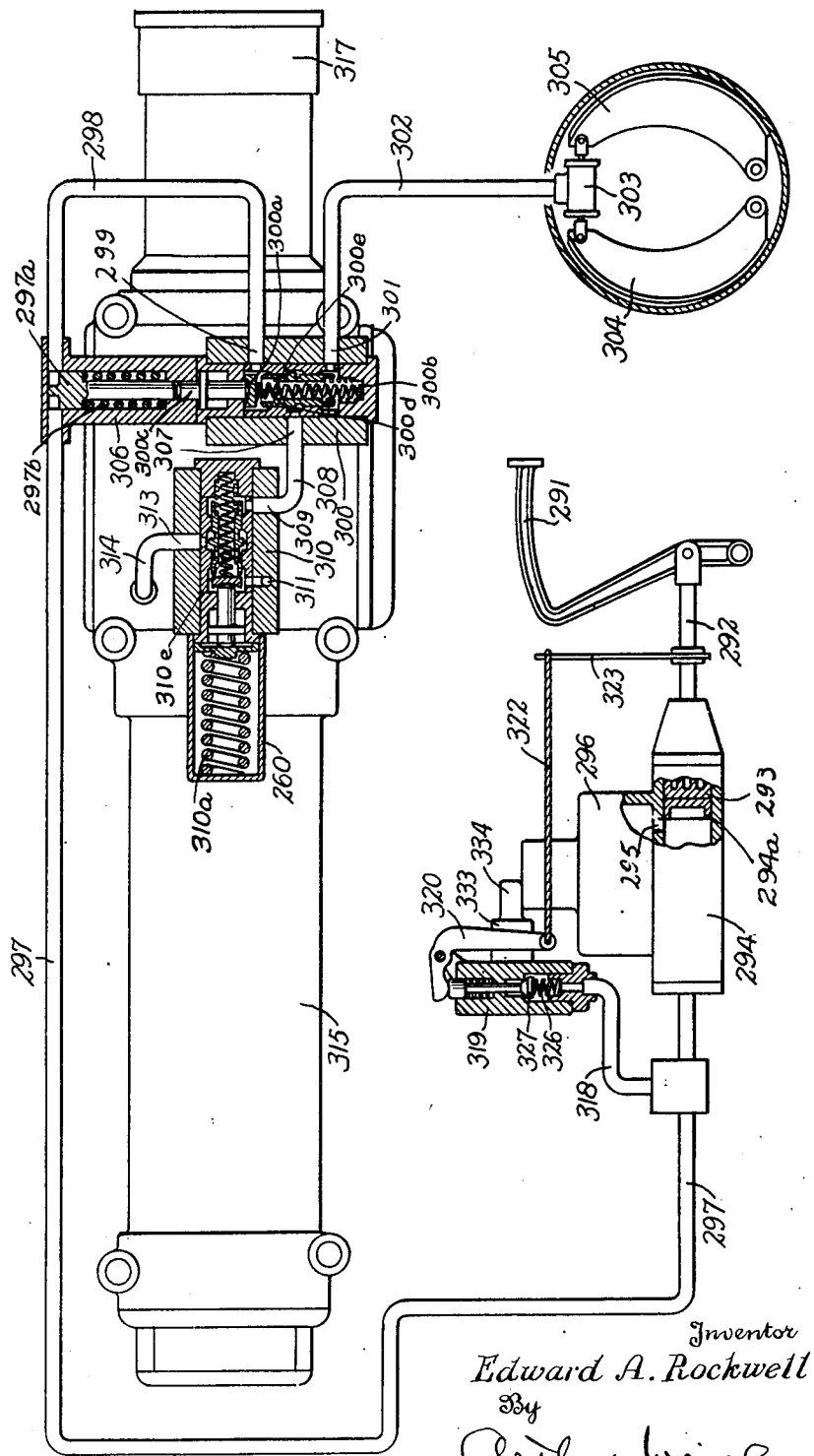

Patented Nov. 11, 1952

2,617,259

UNITED STATES PATENT OFFICE 2,617,259

MASTER CYLINDER POWER SYSTEM

Edward A. Rockwell, Shaker Heights, Ohio, assignor to The New Britain Machine Company, New Britain, Conn., a corporation of Connecticut Application February 17, 1943, Serial No. 476,248, now Patent No. 2,410,750, dated November 5, 1946, which is a division of application Serial No. 312,356, January 4, 1940, now Patent No. 2,331,800, dated October 12, 1943. Divided and this application August 15, 1946, Serial No. 690,639

7 Claims. (Cl. 60—52)

My invention relates particularly to a master cylinder construction, that is to say an apparatus designed to transmit hydraulic pressure from a cylinder carrying a piston to any desired parts to be operated by the force of said hydraulic liquid, and the system including the same.

This application is a division of my application upon High-to-Low Pressure Converter, Ser. No. 476,248, filed February 17, 1943, Patent No. 2,410,750, granted November 5, 1946, which is itself a division of Patent No. 2,331,800, granted October 12, 1943, upon System for Controlling the Application of Power, Ser. No. 312,356, filed January 4, 1940.

The object of my invention is to provide a system whereby the different parts of automotive vehicles may be operated in an advantageous manner so as to maintain adequate control over the same at all times. Another object is to provide an apparatus of this character, in accordance with which the part to be operated may be moved into position initially by means of a fluid applied at one pressure, and thereafter operated to cause the performance of work by said part by fluid at another pressure, this being accomplished, if desired, by various differentials between the pressures applied for moving said part and the manual or actuating pressures utilized for controlling the pressures so applied. Another object of my invention is to provide a master cylinder which is capable of effective operation for the control of any desired apparatus, although it is particularly desirable as applied to the operation of automotive accessories, as for instance automobile brakes. Another object is to provide a master cylinder having effective liquid compensation without requiring the maintenance of a pressure in the discharge outlet line of the master cylinder.

While my invention is capable of embodiment in many different forms, I have shown only certain embodiments thereof in the accompanying drawings, in which—

Fig. 2 is a longitudinal section of an unloader valve used therewith; and

Fig. 3 is a diagrammatic representation of the circuit shown in Fig. 1.

Figure 1:
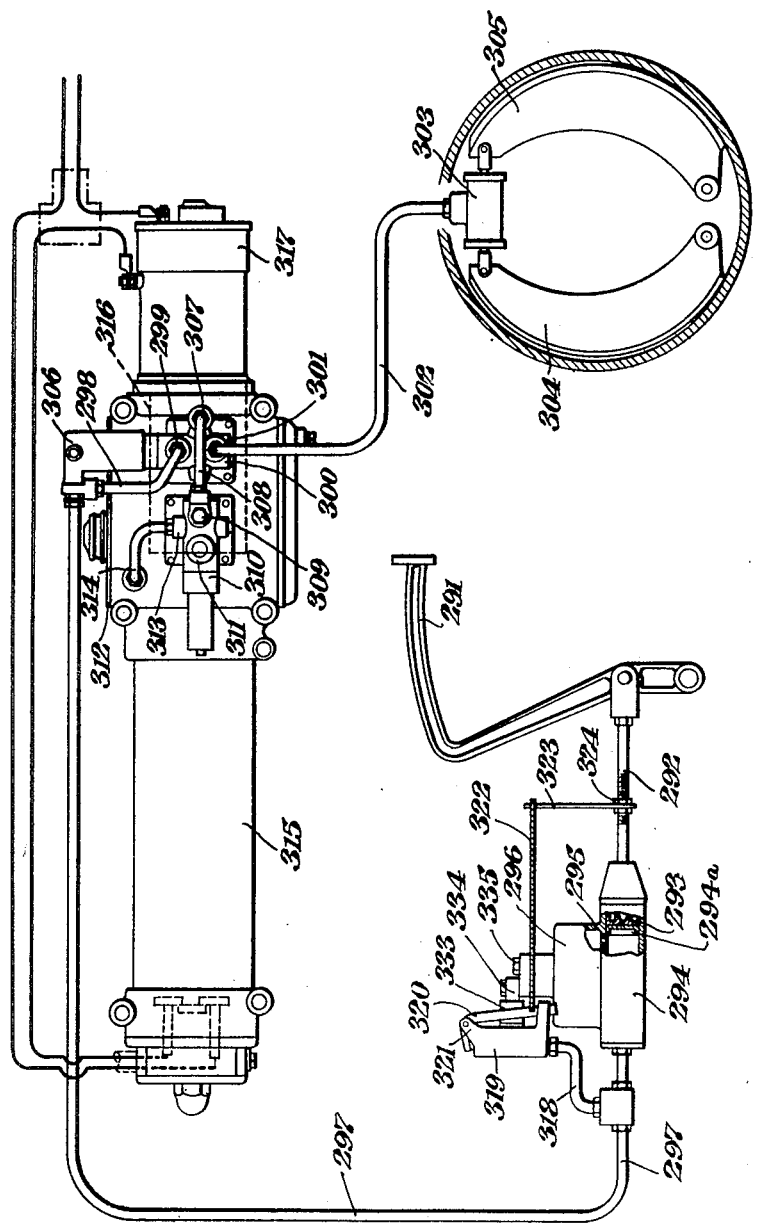
Fig. 1 is an elevation of a system in which a manual fluid pressure is provided for thereafter applying a modulated higher pressure.

Referring to the form of my invention shown in the drawings, a system is provided for first applying a modulated low pressure and for thereafter controlling the application of a modulated high pressure thereby.

In the form of my invention as shown in the drawings I have provided a system for controlling the operation of the parts of automotive vehicles which is designed for installation on units involving heavy duty. In this instance means is provided for initially moving the parts into position by merely a manual force applied hydraulically after which a high pressure liquid is brought into action thereby to apply the braking force. Thereafter the movement of the brake is controlled by a differential between the reaction of the increased pressure applied to the brake and the manual pressure. In this construction a foot pedal 291 is pressed to the left to operate a rod 292 attached to a piston 293 in a master cylinder 294 having a liquid compensating lip seal 294a and an inlet port 295 for liquid from a supply tank 296. The forward movement to the left of the piston 293 will force the liquid out of the cylinder 294 into a pipe 297 containing a differential plunger 297a normally moved upwardly by a spring 297b and thence to a pipe 298 into a low pressure port 299 on a hydraulic operating unit and modulator valve 300 so that the liquid initially passes from the pipe 298 by a disc valve 300a normally pressed upwardly by a spring 300b against a valve operating plunger 300c contacting with the differential plunger 297a to permit the liquid to pass through a tubular valve member carrying on its outside a tapered inlet valve 300d and thence to a port 301 and a pipe 302 to a brake-operating cylinder 303 for moving the brake shoes 304 and 305 into position. This movement of the liquid under manual pressure will continue until the brake shoes 304 and 305 are moved entirely into position, after which the pressure in the pipe 302 will increase to such an extent that the liquid from the pipe 297 will operate the differential plunger 297a which is in a casing 306, and thereby operate the tubular valve member in the modulator valve 300 so as to cut off the entry of liquid from the pipe 298 while modulated high pressure liquid is thereafter delivered by the check valve in the form of a tapered valve 300d on the tubular valve, having a transverse aperture 300e, to the pipe 302 and thence to the brakes to apply the braking force thereto. This high pressure liquid is delivered to the modulator valve 300 through a port 307 from a pipe 308 and is supplied to said pipe from a port 309 in a regulator pressure valve 310, constructed like the modulator valve 300 except that a helical spring 310a keeps the disc valve closed and the conical valve thereof open until a predetermined high pressure has been reached therein. The exhaust or low pressure from the regulator valve 310 passes out by a low pressure port 311 to a tank 312. Furthermore, the high pressure liquid is supplied to said regulator valve 310 by a port 313 from a port 314, as in the said parent patent, which is connected to the discharge side of an accumulator 315, and the liquid under pressure is supplied to said accumulator 315 by means of a rotary pump 316 located in the tank 312 and driven by an electric motor 317. In the return movement of the pedal 291, means is provided for unloading the manual pressure liquid in the pipe 297 quickly to provide uniformity of action at all times by means of a branch pipe 318, which is connected to an unloader valve casing 319 which is opened automatically, so as to establish communication between the pipe 297 and the reservoir 296, by a bell crank lever 320 pivoted on ears 321 on the valve casing 319, the lower end of the bell crank lever 320 being connected by a cable 322 to an arm 323 held in place by nuts 324 on the rod 292. The unloader valve within the casing 319 has a fitting 325, communicating with the pipe 318, which fitting is screw-threaded in the casing 319. The said fitting 325 supports a spring 326 to hold upwardly a valve 327 against a seat 328 within said casing 319. A chamber 329 is provided, in which the valve 327 moves and when the said valve is unseated the chamber 329 communicates with a chamber 330 leading by a passageway 331 to a port 332 and a pipe 333 fastened to a fitting 334 which communicates with the upper portion of the tank 296. A filler cap 335 is also provided on the top of said tank 296. By this means, when the foot is taken off the pedal 291 the liquid in the pipe 297 is automatically unloaded quickly into the tank 296.

In my invention, manual pressure is utilized for bringing the brake shoes into position, after which a high pressure is brought into action for applying the braking force to the brakes. For this purpose, when the foot pedal 291 is manually operated the piston 293 traps some of the liquid received from the port 295 and then forces the same through the pipe 297 and the pipe 298 past the open valve 300a and through the pipe 302 to move the brake shoes 304 and 305 into position. As the pressure of this liquid increases, the hydraulic unit 306 is operated to close the valve 300a, thus unseating the valve 300d and admitting high pressure liquid received from the accumulator 315 to the pipe 302 for applying the force of the high pressure liquid so as to obtain the desired braking effect upon the braking shoes. After the high pressure liquid has been admitted to the brake through the pipe 302 the brake is controlled by the differential between the reaction of the increased pressures in the pipe 302 and the manual pressure being applied to the upper end of the plunger 297a, inasmuch as said increased pressures react upwardly through the plunger 297 against the manual pressures applied to the top thereof. This high pressure liquid, by means of the valve 300a in the desired increments, enables the modulated pressure to be utilized in the in or off modulation so as to obtain a carefully and exactly modulated braking effect, that is to say a braking effect which is accurately coordinated to the manual force applied to the manual actuating means. Upon the release of the manual pressure the liquid flows in the reverse direction through the pipes 302, 298 and 297, and, due to the unloader valve 319, is discharged quickly through the passageway 332 into the supply tank 296 ready to be used again in the same way when the manual force is again applied to the pedal 291.

While I have described my invention above in detail I wish it to be understood that many changes may be made therein without departing from the spirit of the same.

I claim:

1. In combination, a hydraulic line connected to a part to be operated, a master cylinder having a manually operable member adapted to move the liquid therein by the manual force applied, means for accumulating intermittently a body of liquid under a substantially uniform superatmospheric pressure, and a valve means, having a hydraulic connection to the master cylinder, said valve means being actuated by the pressure of said pressure liquid in said master cylinder, for cutting off the pressure liquid from said hydraulic line to the part to be operated and delivering the accumulated pressure to said part through which valve means both said pressure liquid and the accumulated pressure liquid pass so as to react on said manually operable member from said pressures, respectively, applied to said part.

2. In combination, a reservoir, a hydraulic line, containing a liquid received from the reservoir, connected to a part to be operated, a master cylinder having a manually operable member adapted to move the liquid therein, means for accumulating intermittently a body of liquid under a substantially uniform superatmospheric pressure and a valve means, having a hydraulic connection to the master cylinder, said valve means being actuated by the pressure of said pressure liquid in said master cylinder, for cutting off the pressure liquid from said hydraulic line to the part to be operated and delivering the accumulated pressure to said part so as to react on said manually operable member from said pressures, respectively, applied to said part, said line having a manually operable unloader located in said line for unloading the liquid therefrom and supplying the same to said reservoir upon the decrease of the pressure in said line.

3. In combination, a device to be moved, a master cylinder having a manual means for applying a manual pressure liquid through to said device, a source of high pressure power, and a pressure operated plunger valve means, having a passage, for controlling the application of increased pressure to the device by a differential between the reaction of an intermittently movable body of liquid producing the increased pressure applied to said device and the manual pressure liquid through which valve means passage, both the manual pressure liquid and the high pressure liquid pass so as to react on said manual means from said pressures, respectively, applied to said device.

4. In combination, a device to be moved, a master cylinder having a manually operated pressure producing means for applying a manual pressure liquid to said device, a source of power applied high pressure fluid, a pressure operated differential plunger means having a passage, including a valve initially biased to close off high pressure fluid to said passage, for controlling the application of increased pressure to the device, having areas subject to said manual pressure and the increased pressure applied to said device respectively by a differential between the reaction of the increased pressure applied to said device and the manual pressure, said valve passage being open in released position to manual pressure fluid flow for liquid compensation, and at a predetermined manual pressure open to the power applied high pressure fluid when greater than the manual pressure, so as to react on said manual means from said pressures, respectively, applied to said device.

5. In combination, a hydraulic line connected to a part to be operated, a master cylinder having a liquid compensating port including a manually operable piston having a liquid compensating lip seal adapted to move the liquid therein by the manual force applied, means for accumulating a liquid under a substantially uniform superatmospheric pressure, and a valve means actuated by the pressure of said pressure liquid, upon the increase in pressure in said line, for cutting off the same and delivering the accumulated pressure to said part through which valve means both the said manually operated liquid and the accumulated pressure liquid pass so as to react on the manually operable piston from said pressures, respectively, applied to said part.

6. In combination, a hydraulic line connected to a part to be operated, a manually operable member adapted to move the liquid therein by the manual force applied, means for pumping a liquid under pressure, and a valve means actuated by the pressure of said pressure liquid, upon the increase in pressure in said line, for cutting off the same and delivering the pumped pressure to said part through which valve means the said manually operated liquid and the pumped liquid pass so as to react on said manually operable member from said pressure, respectively, applied to said part.

7. In a fluid pressure actuating system, a fluid motor, a manually-operated pressure developing means, reactive at all times to the pressure applied to the fluid motor, having a delivery outlet to said motor for work performance, a hydraulic pressure developing pump having its outlet in communication with the motor and in reactive connection with said manually-operated pressure developing means, check valve means associated with the first mentioned outlet and preventing return of liquid to the pump, which is an electrically driven pump for pumping pressure liquid, means connecting the pump-developed hydraulic pressure to the motor operable by the manually-developed hydraulic pressure, a release valve within said delivery outlet, and means for controlling the closing and opening of the release valve having a hydraulic connection from the manually operated pressure developing means to the release valve.

EDWARD A. ROCKWELL.

REFERENCES CITED

The following references are of record in the file of this patent:

UNITED STATES PATENTS

| Number | Name | Date |
|---|---|---|
| 1,333,660 | Hutchins | Mar. 16, 1920 |
| 1,701,297 | Custenborder | Feb. 5, 1929 |
| 1,903,973 | Boughton | Apr. 18, 1933 |
| 1,983,884 | Hele-Shaw | Dec. 11, 1934 |
| 2,000,187 | Oliver | May 7, 1935 |
| 2,009,515 | Pardee | July 30, 1935 |
| 2,029,096 | Doyle | Jan. 28, 1936 |
| 2,239,481 | Christensen | Apr. 22, 1941 |
| 2,260,490 | Stelzer | Oct. 28, 1941 |
| 2,336,887 | Piron | Dec. 14, 1943 |
| 2,405,759 | Schnell | Aug. 13, 1946 |

FOREIGN PATENTS

| Number | Country | Date |
|---|---|---|
| 777,932 | France | Dec. 15, 1934 |
| 835,760 | France | Oct. 3, 1938 |